UNITED STATES PATENT OFFICE.

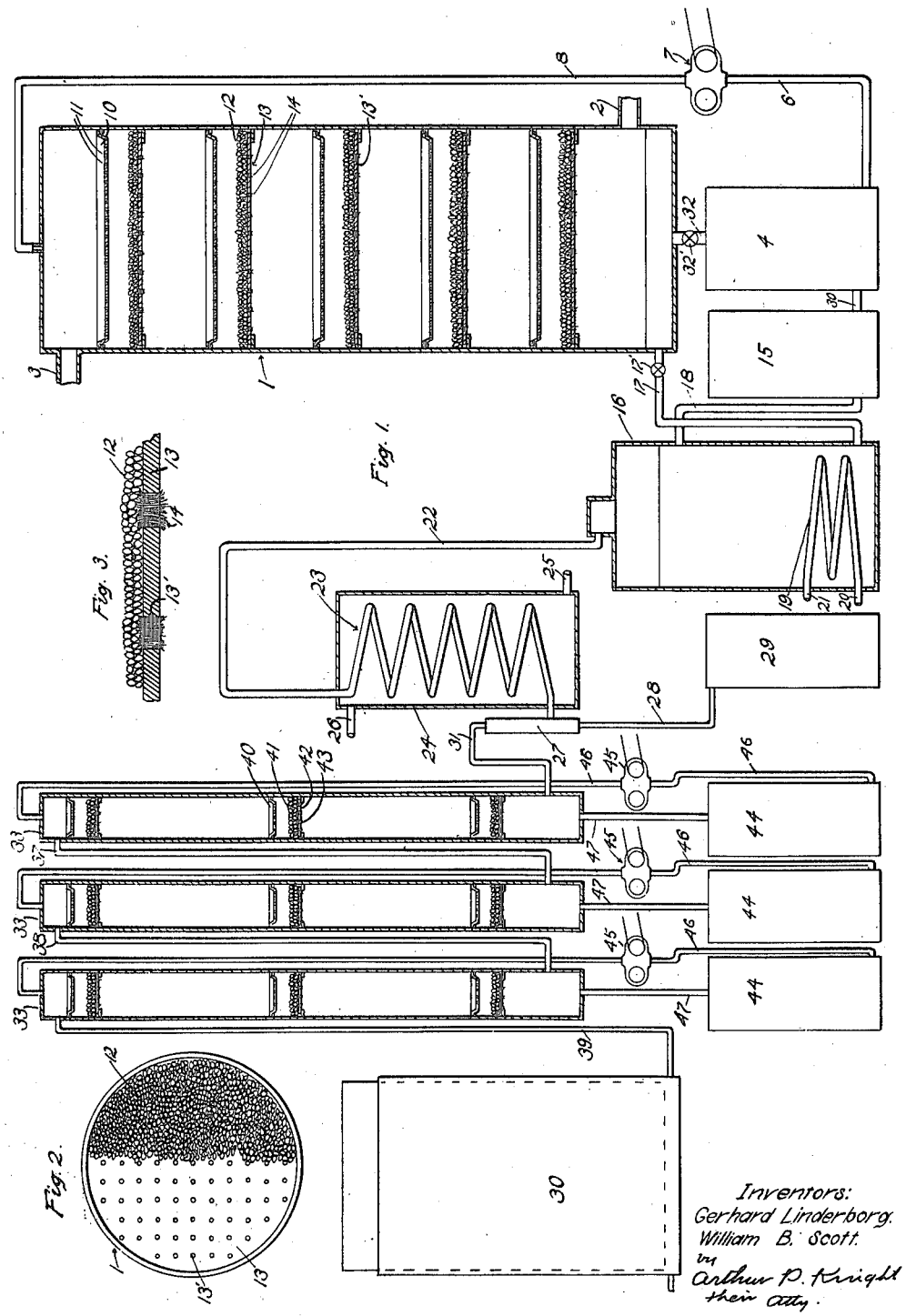

GERHARD LINDERBORG AND WILLIAM B. SCOTT, OF LOS ANGELES, CALIFORNIA.

PROCESS AND APPARATUS FOR OBTAINING HYDROCARBONS FROM GASES.

1,220,651.

Specification of Letters Patent.

Patented Mar. 27, 1917.

Application filed January 15, 1916. Serial No. 72,240.

*To all whom it may concern:*

Be it known that we, GERHARD LINDERBORG, a subject of the King of Sweden, and WILLIAM B. SCOTT, a citizen of the United States, both residing at Los Angeles, in the county of Los Angeles and State of California, have invented a new and useful Process and Apparatus for Obtaining Hydrocarbons from Gases, of which the following is a specification.

This invention relates to the treatment of natural gases containing hydrocarbons, in order to obtain the commercially valuable hydrocarbons therefrom in liquid form.

The main object of our invention is to provide for the recovery of such hydrocarbons in the most effective manner and with the greatest economy. In carrying out our invention we employ an absorbent liquid for taking up the hydrocarbon from the gas, and an important object of the invention is to provide for use of an absorbent liquid which will be more effective than the absorbent materials heretofore proposed for such purposes. Another object of our invention is to utilize for such absorbent, a material which is comparatively cheap. A further object of our invention is to so carry out the process that valuable hydrocarbon constituents are recovered from comparatively cheap or valueless absorbent liquid material, together with the hydrocarbons recovered from the gas.

The accompanying drawing illustrates an apparatus suitable for carrying out our invention, and referring thereto:

Figure 1 is a vertical section of the apparatus partly in elevation.

Fig. 2 is a plan view of one of the perforated plates for supporting divided solid material in the absorber, a part of such material being shown in place.

Fig. 3 is a partial vertical section through such plate and solid material.

Our process is applicable particularly to the recovery of hydrocarbons such as gasolene or kerosene, from well gases or similar gases, and the process is directed particularly to the production of conditions which will result in the separation of the hydrocarbons from the gases even when the latter are unsaturated with such hydrocarbons, thereby enabling a more complete separation.

Our process is based on the absorption of liquid hydrocarbons from the gas by means of a special absorbent liquid, namely, an emulsion of a liquid hydrocarbon with water, and subsequent distillation so as to recover the liquid hydrocarbon so absorbed, together with some liquid hydrocarbon derived from the absorbent liquid.

The apparatus shown in the drawings for carrying out our invention comprises means for absorbing the hydrocarbon vapors from the gas, means for distilling off the vapors so absorbed, and means for condensing or otherwise collecting in liquid form the vapors so distilled.

The means for absorbing the vapors from the gas comprises a chamber or vessel 1, provided with inlet means 2 and outlet means 3, whereby the gas to be treated is passed through the chamber, preferably from the lower to the upper portion thereof, and means for circulating liquid through the chamber, in such manner as to bring it into effective contact with the gas. 4 indicates a receiver or tank for the said liquid, said tank being connected by pipe 6 to a pump 7 whose outlet is connected by pipe 8 to the top of chamber 1, so as to force the liquid from receiver 4 into the upper part of chamber 1. Suitable means are provided for spreading out the liquid causing it to descend in the chamber 1 in a finely divided condition, preferably in the form of drops, so as to expose maximum surface to the gas. For this purpose pans 10 may be provided in the chamber 1 adapted to receive the liquid and having perforations 11, through which the liquid may drip or fall in drops. Within the chamber 1, for example, below the respective pans are provided means for acting on the gas in such manner as to favor and induce condensation of unsaturated vapor therein, said means consisting of solid bodies provided with a multiplicity of points or sharp edges. As an example of such means we have shown broken or crushed glass indicated at 12, supported on perforated plates 13, plugs 14 of mineral wool or glass fiber being placed in the perforations 13' of plates 13, and protruding below said plates so as to form projections or tufts presenting a multiplicity of sharp points on which the condensed vapor may collect.

The distilling means may be of any suitable type, being here shown as a steam still, comprising a tank 16, having inlet pipe 17 through which it may be supplied with liquid from the tank 1, and having an outlet pipe 18, through which the liquid may be discharged to a cooler 15 from which a pipe 30 leads back to the tank 4. A pipe connection 32 may be provided from the bottom of chamber 1 to the tank 4. The pipe connections 17 and 32 may be provided with valves 17' and 32'. A steam coil 19 extends within the tank 16 and is connected to inlet and outlet pipes 20 and 21, for circulating steam therethrough, to heat the contents of tank 16. A vapor pipe 22 leads from the top of tank 16 to a condenser 23, here shown as consisting of a coil extending within a tank 24 provided with inlet and outlet pipes 25 and 26 for circulating cooling water therethrough, said coil discharging into a separator 27 wherein the condensed liquid collects and flows down through pipe 28 into a receiver 29, the uncondensed vapor passing off by pipe 31. In general, the vapor passing off through pipe 31 will contain constituents that can be condensed to the form of liquid under certain conditions, and to effect such condensation we prefer to provide means, herein termed saturators, for withdrawing all the available constituents in liquid form from the vapor, said means comprising a series of chambers 33, connected by piping 37 and 38 so that the vapor is conducted from pipe 31 through all of the chambers successively, and is finally discharged through pipe 39 to a gasometer 30, the vapor passing preferably from bottom to top of each chamber. In each of the chambers 33 are provided means indicated at 40 for distributing liquid therein in the form of drops, and means for exposing extensive surfaces presenting fine points or edges, said means consisting, for example, of crushed glass 41, supported on perforated plates 42, with glass fiber tufts 43 in the perforation of said plates. A liquid receiver 44 is preferably provided in connection with each of the series of chambers 33, a pump 45 and piping 46, 47 being provided for circulating liquid from such receiver through the corresponding chamber 33.

As an absorbing liquid for withdrawing the desired hydrocarbon from the gas, we may use an emulsion of any hydrocarbon and water, preferably using as little water as can be made to effectively emulsify the oil. The said hydrocarbon may, for example, be crude oil, lubricating oil, or other mineral oil, having either an asphalt or a paraffin base.

The process is preferably carried out in the above described apparatus as follows: The gas to be treated, which may be natural gas, or any other gas containing hydrocarbon vapor, either before or after the usual treatment for recovery of gasolene, etc., by compression and cooling, is conducted through the chamber 1, and the liquid from tank 4, consisting as stated, of petroleum emulsion, is circulated by the pump 7 so as to enter the chamber 1 at the top thereof, and drips through the perforations in the distributers 10 onto the solid bodies 12 on the plates 13 and passes through plugs of tufts of glass fiber in the perforations in said plates. In dripping through the chamber 1 and in running over the surfaces of the bodies 12 and of the tufts or sharp pointed bodies 14, the said liquid is brought into contact with the gas so as to exert maximum absorbing effect thereon and to withdraw from the gas a considerable amount of hydrocarbon constituents thereof. We have found that, in practice it is possible by this means, to separate from the gas a much greater amount of hydrocarbon than is practicable with the usual "squeezing" operation. In fact after the usual squeezing operation has been performed on the gas, resulting in the saving of a given amount of gasolene, etc., it is possible by the above described operation to separate about as much more of the liquid hydrocarbons from the same gas. If it is desired to repeat the exposure of the liquid to the gas, it may be circulated repeatedly through chamber 1, by opening valve 32' and closing valve 17'.

When the liquid has, by exposure to the gas, in passing through the chamber 1, been caused to take up as much of the hydrocarbon constituents of the gas as is practicable, it is passed through the still tank 16, by opening valve 17' and closing valve 32', and is therein subjected to the action of heat derived from the steam coil 19, substantially all the hydrocarbons absorbed from the gas have been evaporated from the liquid and caused to pass off through outlet 31. The remaining liquid is then passed by pipe 18 to cooler 15 and is returned to the tank 4, after cooling to proper temperature, by pipe 30, for a repetition of the operation.

The vapor passing off through pipe 22, is conducted through cooler or condenser 23 and the condensate runs off into receiver 29. The remaining vapor passes to the series of devices 33, wherein it is subjected to the action of contact with suitable liquids, for example, gasolene, benzin, or other liquid similar in constitution to the hydrocarbon constituents of the vapor, whereby the hydrocarbon constituents referred to are absorbed and washed away into the respective receivers or tanks 44.

We have found that when the temperature of the gas and liquid in the chamber 1 are suitably regulated, liquid hydrocarbons are separated or recovered from the gas, under conditions of temperature and pressure which would not ordinarily result in such separation or recovery, and on the other hand, in the subsequent distillation, hydrocarbons are obtained of lighter gravity than the hydrocarbon used in the emulsion, under conditions of temperature and pressure of distillation which would not otherwise result in the production of such lighter hydrocarbons, and that a part of such lighter hydrocarbons so produced is obtained from the hydrocarbon used in the emulsion in addition to the part obtained from the gas. On this account and on account of unavoidable losses in evaporation it is desirable to supply emulsion to the chamber 1 or to tank 4, in such manner as to maintain the necessary body of such emulsion for action on the gas. The use of an emulsion of heavy hydrocarbons is of advantage for the following reasons: The water present tends to maintain uniformity of temperature in the absorber, and, being introduced along with the oil, either from cooler 15 or from an outside source of replenishment, it tends to cool the gas passing through the absorber and to thereby facilitate condensation and collection of the liquid hydrocarbon therefrom; moreover, the natural gas in passing through the absorber, does not tend to drag or entrain parts of the emulsion, as it does in case no water is present with the oil; on the other hand, the water present in the emulsion, when it is subjected to heat in the still evaporates in such manner as to bubble through the liquid and cause foaming, which facilitates and expedites the liberation of the relatively volatile liquid hydrocarbons from the body of liquid, including not only the liquid hydrocarbon that was absorbed from the natural gas, but also some liquid hydrocarbon in or derived from the absorbent liquid. Furthermore, by utilizing such crude oil emulsions which are produced in great quantities either directly from the wells or as by products or residues of oil refining operations, and are largely either unmerchantable or of little value, we are enabled to not only separate and recover the liquid hydrocarbon from the natural gas at a nominal cost for absorbent material, but to utilize such materials, which are of little value otherwise, in obtaining directly therefrom a considerable quantity of comparatively valuable hydrocarbon, in addition to that derived from the natural gas.

It will be understood that the natural gas will be passed through the chamber 1 at the temperature and pressure at which it comes from the well or from the "squeezing" apparatus, as the case may be. The temperature and pressure in the still 16 may however be regulated in any desired manner, and we prefer to maintain the pressure in said still as low as practicable, with the result that a lower temperature is required and more effective and economical distillation is obtained. The pressure in chamber 1 will, in general, be considerably in excess of atmospheric pressure.

An important feature of the present invention is the provision of the mineral wool or glass fiber, consisting of finely divided filamentary and acicular material presenting sharp points, which I have found to be especially effective in promoting condensation and absorption of the vapor in the absorbent liquid. Such acicular and filamentary bodies I have found to be much more effective in promoting absorption and condensation of the vapor than the bodies usually used for such purposes, namely, broken stone, coke, and the like.

What we claim is:

1. The process which consists in bringing natural gas containing gasolene, distillate or similar hydrocarbons of relatively low boiling point, into contact with a liquid consisting of an emulsion of water and a hydrocarbon of relatively high boiling point in such manner as to cause absorption of liquid hydrocarbon from the gas by said emulsion, and then treating the emulsion to separate the absorbed hydrocarbon therefrom.

2. The process which consists in bringing natural gas containing gasolene, distillate or similar hydrocarbons of relatively low boiling point, into contact with a liquid consisting of an emulsion of water and a hydrocarbon of relatively high boiling point, in such manner as to cause absorption of liquid hydrocarbon from the gas by such emulsion, and then subjecting the emulsion to heat to separate therefrom the absorbed hydrocarbon, together with hydrocarbon derived from the emulsion.

3. The process of obtaining gasolene, distillate or like hydrocarbons from natural gas containing the same, which consists in causing the gas to flow past and in contact with an emulsion of hydrocarbon and water, in such manner as to cause liquid hydrocarbon to be absorbed from the gas by said emulsion, heating the emulsion to drive off the absorbed hydrocarbon, collecting the hydrocarbon so driven off, cooling the residue of the emulsion and utilizing such cooled residue in repetition of the process.

4. The process of separating a liquid hydrocarbon from gas containing the same, which consists in passing the gas through a body of filamentary material presenting sharp points, and simultaneously passing an absorbent liquid through said body of filamentary material, in such manner that liquid hydrocarbon is caused to be absorbed in such absorbent liquid.

In testimony whereof we have hereunto set out hands, at Los Angeles, California, this 8th day of January, 1916.

GERHARD LINDERBORG.
WILLIAM B. SCOTT.